(12) United States Patent
Ebara et al.

(10) Patent No.: US 6,889,512 B2
(45) Date of Patent: May 10, 2005

(54) ON-VEHICLE AIR CONDITIONER

(75) Inventors: Toshiyuki Ebara, Osaka (JP); Hiroshi Mukaiyama, Osaka (JP); Osamu Kuwabara, Osaka (JP); Toshikazu Ishihara, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 255 days.

(21) Appl. No.: 10/257,489

(22) PCT Filed: Feb. 12, 2002

(86) PCT No.: PCT/JP02/01152
§ 371 (c)(1),
(2), (4) Date: Nov. 25, 2002

(87) PCT Pub. No.: WO02/064389
PCT Pub. Date: Aug. 22, 2002

(65) Prior Publication Data
US 2004/0007006 A1 Jan. 15, 2004

(30) Foreign Application Priority Data
Feb. 13, 2001 (JP) ........................................ 2001-035991

(51) Int. Cl.⁷ ................................................. B60H 1/32
(52) U.S. Cl. ............................ 62/244; 62/62; 62/228.5; 62/510
(58) Field of Search ............................... 62/244, 196.1, 62/196.2, 187, 228.5, 510

(56) References Cited

U.S. PATENT DOCUMENTS

| | | | | |
|---|---|---|---|---|
| 4,936,109 A | * | 6/1990 | Longardner | 62/238.3 |
| 5,050,391 A | * | 9/1991 | Tsimerman | 62/94 |
| 6,038,877 A | * | 3/2000 | Peiffer et al. | 62/244 |
| 6,349,561 B1 | * | 2/2002 | Huang et al. | 62/470 |
| 6,371,202 B1 | * | 4/2002 | Takano et al. | 165/202 |
| 6,481,222 B1 | * | 11/2002 | Denniston | 62/94 |
| 6,539,746 B1 | * | 4/2003 | Haussmann | 62/513 |

FOREIGN PATENT DOCUMENTS

| | | |
|---|---|---|
| JP | 57-52766 A | 3/1982 |
| JP | 402057420 A * | 2/1990 |
| JP | 8-121889 A | 5/1996 |
| JP | 11-142007 A | 5/1999 |

OTHER PUBLICATIONS

Microfilm of the specification and drawings annexed to the request of Japanese Utility Model Application No. 74024/1979 (Laid–open No. 174571/1980) (Mayekawa Mfg., Ltd.), Dec. 15, 1980, (Family: none).

* cited by examiner

Primary Examiner—William E. Tapolca
Assistant Examiner—Mohammad M. Ali
(74) Attorney, Agent, or Firm—Weingarten, Schurgin, Gagnebin & Lebovici LLP

(57) ABSTRACT

The present invention concerns an on-vehicle airconditioner, resolving problems of the prior art, and allowing to perform cooling, heating, dehumidification or others efficiently even for vehicles of low waste heat, such as hybrid cars taking electricity and gasoline as energy source, idle stop coping cars or battery cars taking only electricity as energy source, or other vehicles, by cooling by loading a refrigeration circuit, using for example $CO_2$ refrigerant, and provided with an electrically driven two-stage compression system compressor, and at the same time, installing a refrigerant heat exchanger for cooling the refrigerant, compressed in the first stage in a way to exchange heat with the car interior air, and using conveniently also for heating together with the heat of the cooling water for cooling the engine.

2 Claims, 3 Drawing Sheets

ON-VEHICLE AIR CONDITIONER

FIELD OF THE INVENTION

The present invention concerns an on-vehicle air-conditioner used for vehicles of low waste heat such as hybrid cars using electricity and gasoline as energy source, idle stop coping cars, or others.

BACKGROUND ART

Ordinary vehicles travel taking the power out of an internal combustion engine using gasoline as fuel, and such vehicles have an on-board refrigeration circuit, and the cooling is performed by evaporating refrigerant in an evaporator for performing the cooling, and cooling the car interior air by the generated cold heat.

In addition, the heating is performed by heating the car interior air by the heat of the cooling water for cooling the engine.

Nonetheless, as such vehicles take out the driving force through combustion of gasoline or others, the control or regulation of hazardous materials contained in the exhaust gas thereof comes to be desired zealously.

Moreover, conventionally, as refrigerant for cooling and refrigeration apparatus, for instance, chlorodifluoromethane (R22, boiling point −40.8° C.) or the like have been used. However, R22 or the like become the object of the fluorine regulation because they destroy the ozone layer by their high latency of ozone destruction, when they are released in the atmosphere and attain the ozone layer in the upper air of the Earth.

The destruction of this ozone layer is provoked by chlorine group (Cl) in the refrigerant. There, refrigerants not containing chlorine group, for example, alternative refrigerants such as difluoromethane (HFC-32, R32, boiling point −52° C.) or others have been proposed; however, they ended up by being included in gases to be regulated by The 3rd Session of the Conference of the Parties to the United Nations Framework Convention on Climate Change, Kyoto, 1997, because Global Warming Potential (GWP) is 1300 to 1900, and their use comes to be difficult.

In such trend of attaching importance to the environment, natural refrigerants such as $CO_2$ or others existing in the natural world and imposing less load to the environment attract attention, because they are free from ozone layer destruction effect, combustibility or toxicity and, furthermore, they are extremely friendly to the environment as their global warming potential (GWP) is 1, and in addition, they are economical.

Nonetheless, in case of applying $CO_2$ refrigerant to a refrigeration circuit, as a high operation pressure equal or superior to 3 times (for instance, 10 megapascals) compared to the refrigerant for air-conditioner of the prior art is required, there is a problem of closness of the compression chamber in the single stage compression system compressor structure of the prior art, and for example, it can only compress to the level of 6 megapascals, and there was a problem that $CO_2$ could not be used as refrigerant.

There, a two-stage compression system compressor for compressing $CO_2$ from 3 megapascals to 6 megapascals (intermediate pressure) in the first stage and, further, compressing from 6 megapascals to 10 megapascals in the second stage before discharging has been proposed.

It has been proposed to use $CO_2$ as refrigerant for hybrid cars and idle stop coping cars taking electricity and gasoline as energy source, battery cars taking only electricity as energy source, or other vehicles, perform the cooling by loading a refrigeration circuit provided with a two-stage compression system compressor driven by electricity, and perform the heating, on the other hand, by the heat of the chilled water for cooling the engine.

Whatsoever, the waste heat of such vehicles is low, and there was a problem that a sufficient heating could not be performed.

It is an object of the present invention to provide an on-vehicle air-conditioner that can solve problems of the prior art, and perform effectively cooling, heating, dehumidification, or others, even in case of using $CO_2$ refrigerant, in vehicles of low waste heat, such as hybrid cars taking electricity and gasoline as energy source, idle stop coping cars or battery cars taking only electricity as energy source, or other vehicles.

DISCLOSURE OF THE INVENTION

The Inventors have studied diligently to solve problems of the prior art, found that the problems can be solved by cooling by loading on board a refrigeration circuit using for example $CO_2$ refrigerant, and provided with an electrically driven two-stage compression system compressor and, at the same time, installing a refrigerant heat exchanger for cooling the refrigerant compressed in the first stage in a way to exchange heat with the car interior air, and using also for heating conveniently together with the heat of the cooling water for cooling the engine, and thereby came to realize the present invention.

In short, the on-vehicle air-conditioner of claim 1 of the present invention is an on-vehicle air-conditioner comprising:

a refrigeration circuit having a two-stage compression system compressor for cooling the refrigerant compressed in the first stage by a refrigerant heat exchanger, and compressing further the chilled refrigerant in the second stage before discharging, and an evaporator installed in a way to exchange heat with the car interior air, a cooling water circuit provided with a cooling water car interior heat exchanger for heating, where the engine cooling water circulates, installed in a way to exchange heat with the car interior air, and a damper apparatus for controlling the air course of whether or not passing the car interior air through the evaporator and/or cooling water car interior heat exchanger for heating, wherein:

the refrigerant heat exchanger is installed in a way to exchange heat with the car interior air, allowing to use for car interior heating together with the cooling water car interior heat exchanger for heating.

The on-vehicle air-conditioner of claim 2 of the present invention, is the on-vehicle air-conditioner of claim 1, wherein the refrigerant is $CO_2$.

BEST MODE FOR CARRYING OUT THE INVENTION

Now, embodiments of the present invention are described in detail using drawings.

Figure 1:
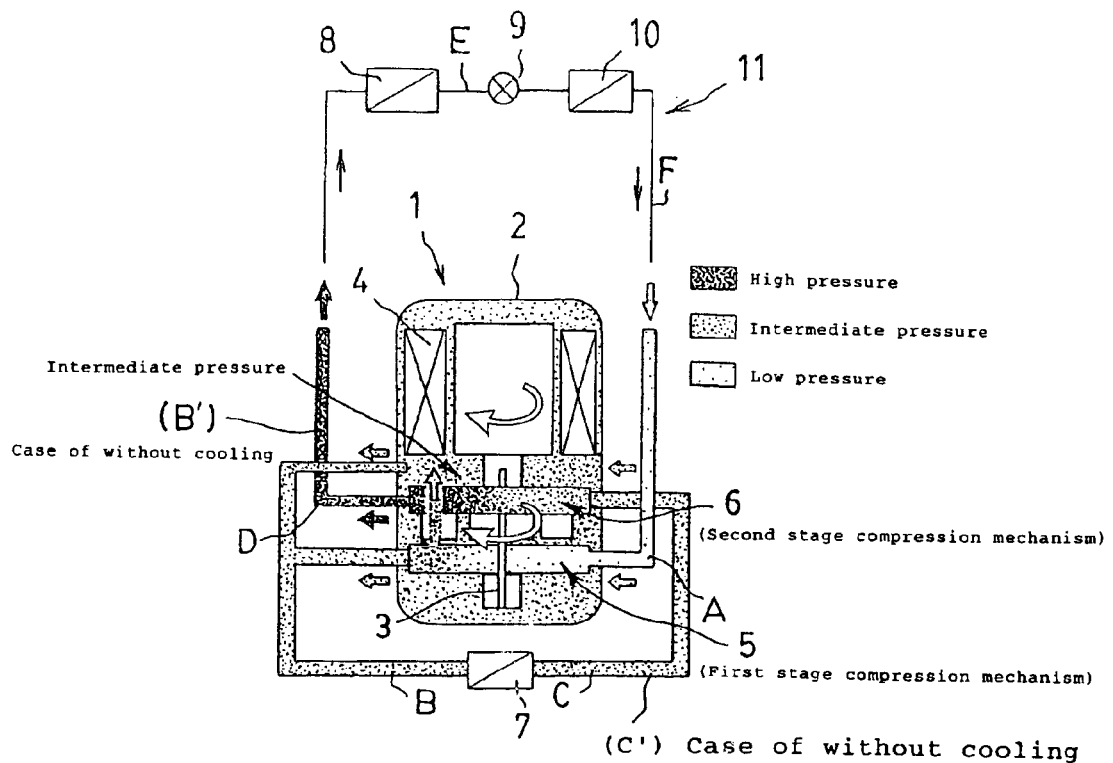
FIG. 1 is an illustrative drawing of a refrigeration circuit provided with a two-stage compression system compressor to be used for the present invention and an evaporator to be used as refrigerant car interior heat exchanger.

In FIG. 1, a two-stage compression system compressor 1 to be used for the present invention comprises a motor 4 having a drive shaft 3 above in a closed vessel 2 and a first stage compression mechanism (rotary system) 5 to be driven by the drive shaft 3 at the lowest part in the closed vessel 2 and a second stage compression mechanism (rotary system) 6 in a way to interlock with a phase difference of 180 degrees, a low pressure refrigerant (3 megapascals) is sucked by the first stage compression mechanism (rotary system) 5 passing through F→A as shown by the arrow, the refrigerant gas compressed to an intermediate pressure (megapascals) splits partially into the closed vessel 2, while the other splits to an external piping, refrigerant split into 2 paths joins again outside the closed vessel 2, thereafter, passes through B and is cooled down in the refrigerant heat exchanger 7, and the cooled refrigerant passes through C and is sucked into the second stage compression mechanism (rotary system) 6 and compressed to a high pressure (10 megapascals), before being discharged from the two-stage compression system compressor 1.

The refrigerant discharged in such a way passes through D and is cooled by a gas cooler 8 before becoming supercritical state, while the cooled refrigerant passes through E, evaporates in an expansion valve 9→evaporator (refrigerant car interior heat exchanger) 10, generates a cold heat and becomes a low pressure refrigerant, in a way to use the refrigerant cyclically and compose a refrigeration circuit 11.

Figure 2:
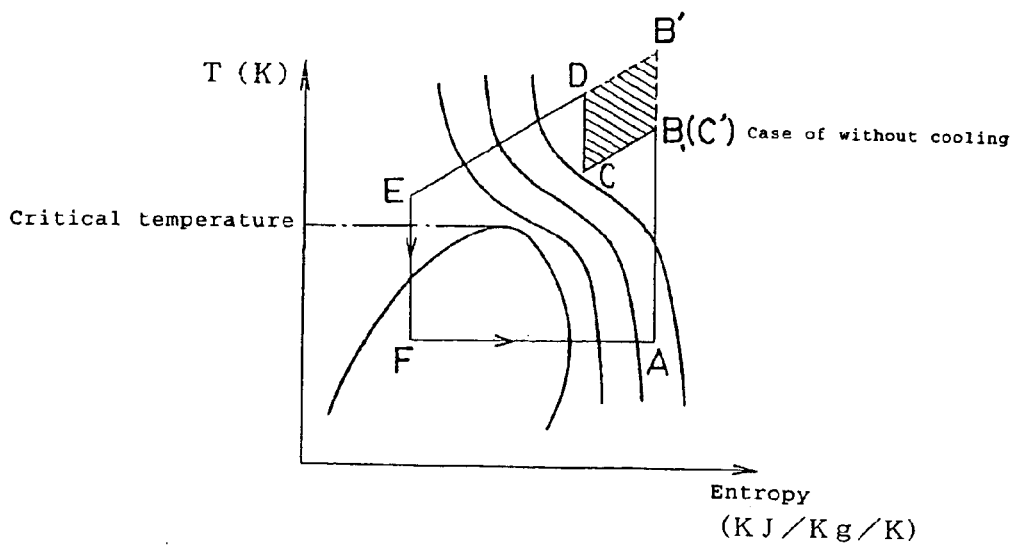
FIG. 2 is a Moliere diagram in the refrigeration circuit shown in FIG. 1.

A to F in the Moliere diagram of FIG. 2 correspond to respective points A to F in the refrigeration circuit of FIG. 1. B→B'→D in FIG. 2 shows the case where the refrigerant compressed in first stage compression mechanism (rotary system) 5 is not cooled by the refrigerant heat exchanger 7, but compressed further by second stage compression mechanism (rotary system) 6, for elevating the refrigerant temperature furthermore.

The energy corresponding to the area shown by oblique lines surrounded by B→C→D→B'→B is equivalent to the reduction of power required for driving the two-stage compression system compressor 1 through the cooling of the refrigerant by the refrigerant heat exchanger 7.

Figure 3:
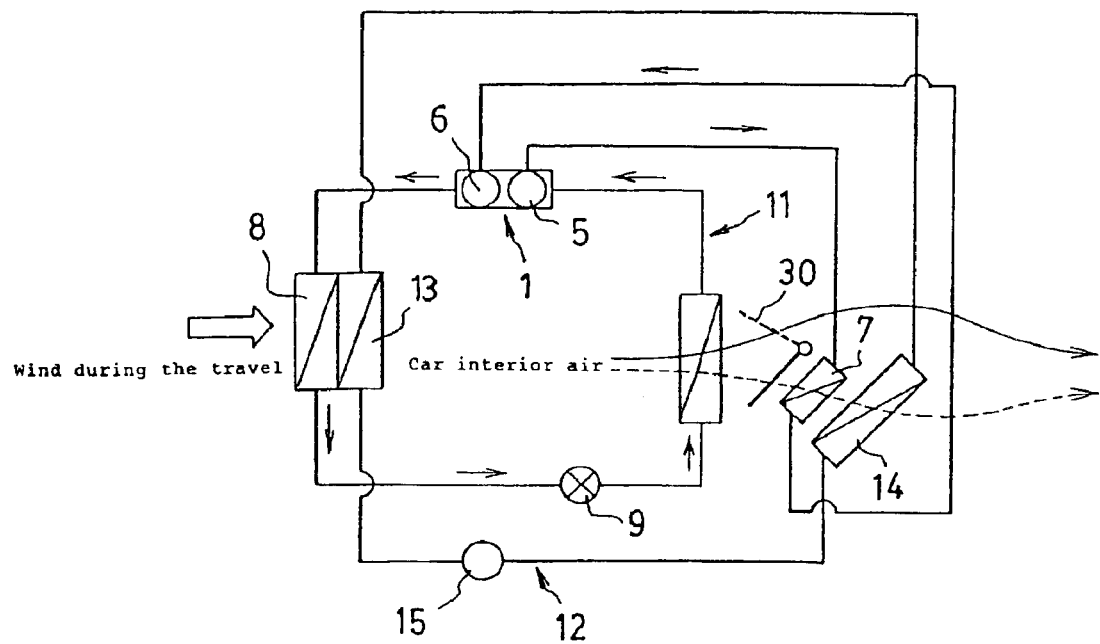
FIG. 3 is a block diagram of first embodiment of the on-vehicle air-conditioner of the present invention.

In FIG. 3, repetition of description is omitted by affording identical reference symbols to the same component parts as component parts shown in FIG. 1 to 2.

FIG. 3 shows the composition of first embodiment of the on-vehicle air-conditioner of the present invention, comprising necessarily a refrigeration circuit 11, a cooling water circuit 12, a damper apparatus 30 for controlling the flow of car interior air, or others.

The cooling water circuit 12 has a so-called cooling water car exterior heat exchanger 13 where the cooling water circulates for cooling a not shown engine such as internal combustion engine or others, a cooling water car interior heat exchanger for heating 14 installed in the car interior side for exchanging heat between the car interior air and the cooling water, a pump 15 for circulating cooling water among them, or others.

In addition, a refrigerant heat exchanger 7 for cooling the refrigerant compressed by the first stage compression mechanism 5 is installed forward in the vicinity of the cooling water car interior heat exchanger for heating 14.

The installation position of the refrigerant heat exchanger 7 is not particularly limited; however, it is preferable to installed in front of the cooling water car interior heat exchanger for heating 14, because this allows to increase the area shown by oblique lines surrounded by B→C→D→B'→B shown in FIG. 2, and reduce more the force required for driving the two-stage compression system compressor 1.

In the following description, what is cooled by the cooling water is supposed to be the aforementioned engine and described as such; however, in the present invention, it is not limited to this, but it may be what is aiming at the cooling of power control elements in the electric car.

In case of cooling by means of the refrigeration circuit 11, cold heat is generated in the evaporator 10 by circulating the refrigerant as shown by the continuous line, the car interior air is delivered to the evaporator 10 by a not shown fan, whereby, the refrigerant exchanges heat with the car interior air, evaporates and returns to the two-stage compression system compressor 1. As the heat for evaporating the refrigerant is delivered from the car interior air, the temperature of the car interior air lowers as much, cooling the car interior.

It should be appreciated that, at this time, if the car interior air that has exchanged heat with the evaporator 10 is sent to the refrigerant heat exchanger 7 and the cooling water car interior heat exchanger for heating 14, the temperature of the car interior air once cooled elevates; therefore, a damper apparatus 30 moves to the position shown by the continuous line in order to prevent the car interior air from entering the refrigerant heat exchanger 7 and the cooling water car interior heat exchanger for heating 14.

On the other hand, during the heating operation, a pump 15 is driven at the same time as the vehicle is driven, the cooling water circulates, and the heating by the cooling water circuit 12 is performed and, in addition to this, the heating by the refrigerant heat exchanger 7 is performed in order to refrigerate the refrigerant compressed by the first stage compression mechanism 5.

By setting the damper apparatus 30 at the dot line position, the car interior air is sent by a not shown fan and dehumidified by the evaporator 10, the dehumidified car interior air is sent to the refrigerant heat exchanger 7 and the cooling water car interior heat exchanger for heating 14 and heated for performing the heating.

The damper apparatus 30 may be set at a position between the position shown by the dot line position and the position shown by the continuous line, in order to perform similarly dehumidification by the evaporator 10, and the heating by the refrigerant heat exchanger 7 and the cooling water car interior heat exchanger for heating 14.

In this example, an example of setting the damper apparatus 30 between the evaporator 10 and the refrigerant heat exchanger 7 has been illustrated, the setting position of the damper apparatus 30 is not limited to this, but it is also possible to heat by sending the car interior air only to the refrigerant heat exchanger 7 and the cooling water car interior heat exchanger for heating 14, by prevent the car interior air from exchanging heat through the evaporator 10, for instance, during the heating operation.

Figure 4:
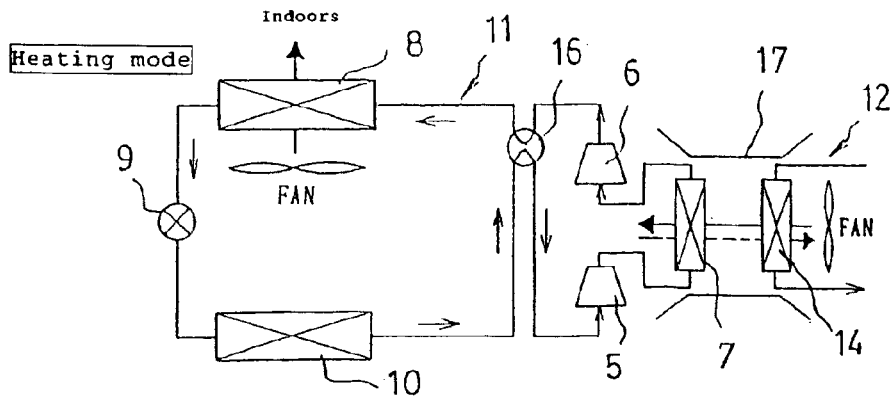
FIG. 4 is a block diagram of another embodiment (heating mode) of the on-vehicle air-conditioner of the present invention.
Figure 5:
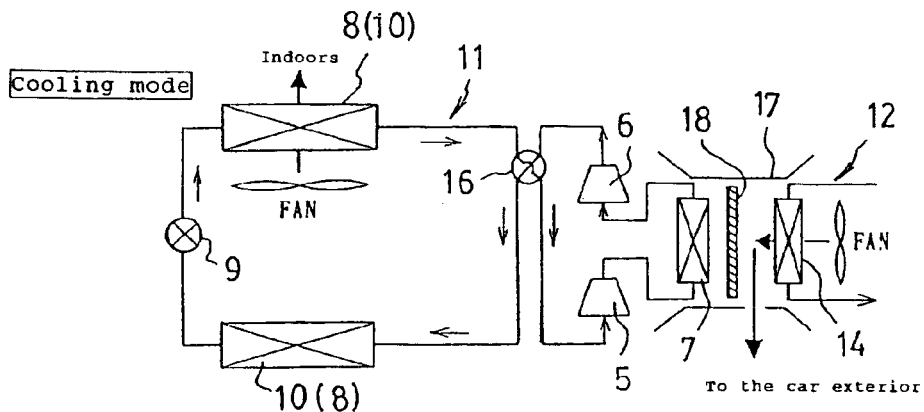
FIG. 5 is a block diagram of another embodiment (cooling mode) of the on-vehicle air-conditioner of the present invention shown in FIG. 4.
Figure 6:
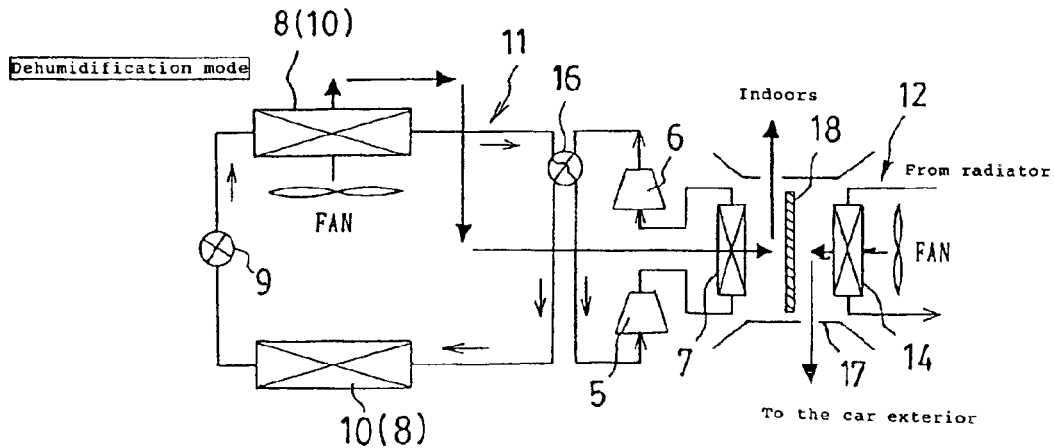
FIG. 6 is a block diagram of another embodiment (dehumidification mode) of the on-vehicle air-conditioner of the present invention shown in FIG. 4.

FIG. 4 to FIG. 6 are block diagrams of other embodiments of the on-vehicle air-conditioner of the present invention.

In FIG. 4 to FIG. 6, repetition of description is omitted by affording identical reference symbols to the same component parts as component parts shown in FIG. 1 to 3.

FIG. 4 shows the composition of another embodiment (heating mode) of the on-vehicle air-conditioner of the present invention, a four-way valve 16 is installed in the refrigeration circuit 11, and the refrigerant can be circulated in the direction shown by the continuous line or, as necessary, in the opposite direction by switching over the four-way valve 16.

In addition, a refrigerant heat exchanger 7 and a cooling water car interior heat exchanger for heating 14 are installed in a duct tube 17 (a kind of damper apparatus used in the present invention), air heated through heat exchange by making the car interior air into contact with the refrigerant heat exchanger 7 and the cooling water car interior heat exchanger for heating 14 by a fan is sent into the car interior from either direction shown by a continuous line or broken line arrow and, at the same time, the car interior air and/or car exterior air is made into contact with a gas cooler 8 in the refrigeration circuit 11, heated by heat exchange, and sent to the car interior. A sufficient heating can be performed, because the refrigerant heat exchanger 7, cooling water car interior heat exchanger for heating 14 and gas cooler 8 are used for heating the car interior air.

FIG. 5 shows the composition of another embodiment (cooling mode) of the on-vehicle air-conditioner of the present invention, and in this cooling mode, the refrigerant can be circulated in a direction opposite to the direction shown by the continuous line in FIG. 4 by switching over the four-way valve 16, and the evaporator 10 is used as gas cooler and the gas cooler 8 as evaporator.

There, a shutter 18 (a kind of damper apparatus used in the present invention) installed between a refrigerant heat exchanger 7 installed in a duct tube 17 (a kind of damper apparatus used in the present invention) and a cooling water car interior heat exchanger for heating 14 is closed as shown, air heated through heat exchange by making into contact with the cooling water car interior heat exchanger for heating 14 by a fan is discharged outside the vehicle and, at the same time, air is prevented from coming into contact with the refrigerant heat exchanger 7; whereby, a sufficient cooling can be performed, because the car interior air exchanges heat by making contact with the evaporator 8 (10), while air heated through heat exchange with the refrigerant 7, cooling water car interior heat exchanger for heating 14 does not circulate in the vehicle.

FIG. 6 shows the composition of another embodiment (dehumidification mode) of the on-vehicle air-conditioner of the present invention, and in this dehumidification mode, the refrigerant is made to circulate in the same direction as FIG. 5 by switching over the four-way valve 16 similarly to FIG. 5, and the evaporator 10 is used as gas cooler and the gas cooler 8 as evaporator.

Then, a shutter 18 (a kind of damper apparatus used in the present invention) installed between a refrigerant heat exchanger 7 installed in a duct tube 17 (a kind of damper apparatus used in the present invention) and a cooling water car interior heat exchanger for heating 14 is closed as shown, air heated through heat exchange by making into contact with the cooling water car interior heat exchanger for heating 14 by a fan is discharged outside the vehicle and, at the same time, air dehumidified through heat exchange by making the car interior air into contact with the evaporator 8 (10) is directed to a refrigerant heat exchanger 7, and an air controlled thereby to an appropriate temperature is sent into the vehicle from a predetermined point of the duct tube 17. Humidification/temperature control can be performed easily, because the air that has exchanged heat with the cooling water car interior heat exchanger for heating 14 does not circulate in the vehicle.

It should be appreciated that the description of the aforementioned embodiments is only illustrative of the present invention and does not intended to limit the invention described in what is claimed, nor reduce the scope. Moreover, the composition of respective parts of the present invention in not limited to the aforementioned examples, but can be modified variously without departing from the technical scoped described in the claims.

In FIG. 1 to 6, 1 indicates a two-stage system compressor, 2 a closed vessel, 3 a drive shaft, 4 a motor, 5 a first stage compression mechanism (rotary system), 6 a second stage compression mechanism (rotary system), 7 a refrigerant heat exchanger, 8 a gas cooler, 9 an expansion valve, 10 an evaporator, 11 a refrigeration circuit, 12 a cooling water circuit, 13 a cooling water car exterior heat exchanger, 14 a cooling water car interior heat exchanger for heating, 15 a pump, 16 a four-way valve, 17 a duct tube and 18 a shutter.

The on-vehicle air-conditioner of claim 1 of the present invention is an on-vehicle air-conditioner comprising a refrigeration circuit having a two-stage compression system compressor for cooling the refrigerant compressed in the first stage by a refrigerant heat exchanger, and compressing further the chilled refrigerant in the second stage before discharging, and an evaporator installed in a way to exchange heat with the car interior air, a cooling water circuit provided with a cooling water car interior heat exchanger for heating, where the engine cooling water circulates, installed in a way to exchange heat with the car interior air, and a damper apparatus for controlling the air course of whether or not passing the car interior air through the evaporator and/or cooling water car interior heat exchanger for heating, wherein the refrigerant heat exchanger is installed in a way to exchange heat with the car interior air, allowing to use for car interior heating together with the cooling water car interior heat exchanger for heating, whereby, the power necessary for driving the two-stage compression system compressor and a high efficiency driving can be realized by reducing the refrigerant temperature even for vehicles of low waste heat, such as hybrid cars taking electricity and gasoline as energy source, idle stop coping cars or battery cars taking only electricity as energy source, or other vehicles, and at the same time, during the cooling for instance, a satisfactory cooling can be realized by preventing the air passing through the refrigerant heat exchanger and cooling water car interior heat exchanger for heating from being sent into the vehicle, and during the heating, a satisfactory heating can be realized by sending the air passing through the refrigerant heat exchanger and cooling water car interior heat exchanger for heating into the vehicle, and during the dehumidification, a satisfactory dehumidification/temperature control can be realized by dehumidifying the car interior air through heat exchange by the evaporator of the refrigerant heat exchanger and, thereafter, sending the air to the refrigerant heat exchanger for heat exchange and then into the vehicle, or otherwise allowing to expect the improvement of efficiency during the heating, cooling and dehumidification or other remarkable effects can be offered. The on-vehicle air-conditioner of claim 2 of the present invention, using $CO_2$ as refrigerant, has the same effect of the on-vehicle air-conditioner of claim 1, and moreover, has a remarkable effect of imposing less load to the environment. Being free from ozone layer destruction effect, combustibility or toxicity and, furthermore, extremely friendly to the environment as Global Warming Potential (GWP) is 1, and in addition, economical.

INDUSTRIAL APPLICABILITY

The industrial use value thereof is considerably important, because problems of the prior art can be resolved, and cooling, heating, dehumidification or others can be performed efficiently even for vehicles of low waste heat, such as hybrid cars taking electricity and gasoline as energy source, idle stop coping cars or battery cars taking only electricity as energy source, or other vehicles, by cooling by loading a refrigeration circuit, using for example $CO_2$ refrigerant, and provided with an electrically driven two-stage system compressor, and at the same time, installing a refrigerant heat exchanger for cooling the refrigerant compressed in the first stage in a way to exchange heat with the car interior air, and using conveniently also for heating together with the heat of the cooling water for cooling the engine.

What is claimed is:

1. An on-vehicle air-conditioner comprising:
a refrigeration circuit having a two-stage compression system compressor for cooling a refrigerant compressed in the first stage by a refrigerant heat exchanger and compressing further the chilled refrigerant in the second stage before discharging, and an evaporator installed in a way to exchange heat with the car interior air, a cooling water circuit provided with a cooling water car interior heat exchanger for heating, where the engine cooling water circulates, installed in a way to exchange heat with the car interior air, and a damper apparatus for controlling an air course of whether or not passing the car interior air through said evaporator and/or cooling water car interior heat exchanger for heating, wherein:
said refrigerant heat exchanger is installed in a way to exchange heat with the car interior air, allowing to use for heating car interior air together with said cooling water car interior heat exchanger for heating.

2. The on-vehicle air-conditioner of claim 1, wherein the refrigerant is $CO_2$.

* * * * *

UNITED STATES PATENT AND TRADEMARK OFFICE
CERTIFICATE OF CORRECTION

PATENT NO. : 6,889,512 B2
APPLICATION NO. : 10/257489
DATED : May 10, 2005
INVENTOR(S) : Toshiyuki Ebara et al.

Page 1 of 1

It is certified that error appears in the above-identified patent and that said Letters Patent is hereby corrected as shown below:

Column 8, lines 1-19, please delete entire text of Claim 1 and replace it with the following text:

--1. An on-vehicle air-conditioner comprising:
a refrigeration circuit, having a two-stage compression system compressor, for cooling a refrigerant, compressed in a first stage by a refrigerant heat exchanger and compressing further a chilled refrigerant in a second stage before discharging, and an evaporator installed in a way to exchange heat with a car interior air; a cooling water circuit provided with a cooling water car interior heat exchanger for heating the interior of the car with engine cooling water, said interior heat exchanger installed to exchange heat with the car interior air, and a damper apparatus for controlling an air course of the car interior air through said evaporator for cooling and/or cooling water car interior heat exchanger for heating, wherein:
said refrigerant heat exchanger is installed in a way to exchange heat with the car interior air, allowing its use for heating car interior air together with said cooling water car interior heat exchanger for heating.--

Signed and Sealed this
Seventeenth Day of May, 2011

David J. Kappos
*Director of the United States Patent and Trademark Office*